(12) United States Patent
Bessolo et al.

(10) Patent No.: US 12,518,219 B2
(45) Date of Patent: Jan. 6, 2026

(54) APPARATUS AND METHOD FOR PROCESSING SENSOR DATA TO PREDICT FUTURE OUTCOMES

(71) Applicant: DynamoEdge LLC, Carmel, IN (US)

(72) Inventors: Barbara Bessolo, Carmel, IN (US); Jeffrey P. Lye, Westfield, IN (US); Randall Hankins, Warsaw, IN (US); Brandon Ditto, Warsaw, IN (US); Justin Wolf, Brush Prairie, WA (US)

(73) Assignee: DynamoEdge Inc., Carmel, IN (US)

( * ) Notice: Subject to any disclaimer, the term of this patent is extended or adjusted under 35 U.S.C. 154(b) by 895 days.

(21) Appl. No.: 17/826,828

(22) Filed: May 27, 2022

(65) Prior Publication Data

US 2022/0414549 A1    Dec. 29, 2022

Related U.S. Application Data

(60) Provisional application No. 63/214,232, filed on Jun. 23, 2021.

(51) Int. Cl.
*G06N 20/20* (2019.01)
*G07C 5/08* (2006.01)

(52) U.S. Cl.
CPC .......... *G06N 20/20* (2019.01); *G07C 5/0808* (2013.01); *G07C 5/0841* (2013.01)

(58) Field of Classification Search
None
See application file for complete search history.

(56) References Cited

U.S. PATENT DOCUMENTS

| | | |
|---|---|---|
| 5,325,082 A * | 6/1994 | Rodriguez .......... B60R 16/0315 340/459 |
| 6,741,169 B2 | 5/2004 | Maigiawala et al. |
| 6,879,938 B2 | 4/2005 | Asano et al. |
| 7,032,436 B2 | 4/2006 | Yokota et al. |

(Continued)

FOREIGN PATENT DOCUMENTS

WO    WO-2023083333 A1 *  5/2023  .......... G06F 3/0644

OTHER PUBLICATIONS

Ens, Barrett et al. "Grand Challenges in Immersive Analytics" Association for Computing Machinery CHI Conference, May 8-13, 2021.

(Continued)

*Primary Examiner* — Abdhesh K Jha
(74) *Attorney, Agent, or Firm* — Michael A. Pugel

(57) ABSTRACT

A method, apparatus, and system are described. The method includes generating a set of current values associated with at least one component included on a moving vehicle and providing the set of current values over a wireless network. The values are generated by one or more sensors. An edge computing device receives the current values. The method further includes processing the set of current values in real-time using at least one machine learning algorithm to identify a value of a point in time for a failure of one of the at least one component based on the set of current values and at least one set of past values received. The past values are stored in a memory. The set of current values are transmitted with a low time latency between the generating the set of current values and the processing of the set of current values.

11 Claims, 5 Drawing Sheets

(56) References Cited

U.S. PATENT DOCUMENTS

| | | | |
|---|---|---|---|
| 7,228,732 B2 | 6/2007 | Turner et al. | |
| 10,674,369 B1* | 6/2020 | Rao | H04W 72/12 |
| 10,814,883 B1* | 10/2020 | Dixit | B60W 50/02 |
| 2023/0038977 A1* | 2/2023 | Ditto | G06F 11/3447 |

OTHER PUBLICATIONS

Perera, Srinath "Rolling Window Regression: A Simple Approach for Time Series Next value Predictions" Internet source unknown, Jun. 2, 2016.

Wadekar, Shakti, et al. "Towards End-to-End Deep Learning for Autonomous Racing: On Data Collection and a Unified Architecture for Steering and Throttle Prediction" arXliv:2105.01799 [cs.RO], May 4, 2021.

* cited by examiner

APPARATUS AND METHOD FOR PROCESSING SENSOR DATA TO PREDICT FUTURE OUTCOMES

CROSS-REFERENCE TO RELATED APPLICATION

This application claims the benefit, under 35 U.S.C. § 119(e), of U.S. Provisional Patent Application 63/214,232, filed on Jun. 23, 2021, which is incorporated herein in its entirety.

TECHNICAL FIELD

The present disclosure generally relates to systems using data analytics to identify or predict future outcomes, and more particularly, to vehicular systems election using data analytics to predict future component failures in real or near-real time.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Data analytics and data science are among the hottest new technical achievements available to businesses today. Data analytics are found in almost all aspects of life, including media content recommendations, shopping, and sporting events, along with business and manufacturing activities. At its simplest level, data analytics can be heuristic, effectively "if this happens then do that type of outcome". However, at a far more complex level data analytics analyze a plurality of current and past data values in a system and perform complex algorithms involving aspects of artificial intelligence including machine learning techniques. It is the latter that has truly led to advancements in determining what to do next in a process or predicting when something, such as a defect in a process or product, is going to happen.

Modern complex data analytics often rely on several elements for proper use. A mechanism is required for collecting data values. These data values may be directly available, such as user inputs, or may be more indirectly available, such as values provided by sensors on electrical and/or mechanical devices. In many cases the data values are required to be transmitted to another device or to another location prior to being processed in a device. A processing device, such as a computer or server, is usually necessary to perform some type of process or algorithm to manipulate the data values into the developed outcome as part of the data analysis. Further, a data storage mechanism is needed to store current as well as past data values that may be used as part of the process or algorithm. Finally, a mechanism is required to convey the developed outcome to where it is needed for use.

Certain industries, such as transportation and manufacturing are now only beginning to utilize artificial intelligence and the data analytics that is made available by its use. The transportation industry represents 29 percent of all energy consumed in the United States in 2021, and the automotive industry is responsible for a significant portion of that. The automotive industry has long relied on different forms of racing to produce innovation that leads to greater efficiencies. The automobile racing platform can benefit greatly from artificial intelligence. However, in many cases the nature of most forms of racing rely on real time interaction, as split second decisions are often the difference between winning or losing, success or failure. Applying artificial intelligence techniques to generate real time data analytics would create a significant advancement in the efficiency of automobile racing and likely drive even greater innovation that could apply to the transportation industry as a whole.

Currently the common practice used with data analytics is to have an offline phase where a learning model is trained on a dataset of values, often past data values and, as a second step, the model is deployed into the data analysis process online to make predictions on new incoming data. Hence, the learning model is treated as a static object. In some cases, the learning model may be updated, but this typically requires returning to the offline phase mentioned above. Machine learning models are deployed in such a manner because although they're extremely robust, they are equally limited by the learning capacity of the model. To learn from new data, the model must be retrained from scratch and with lots of historical data points simulating different situations, consuming massive processing, and storage. Such an approach often does not work effectively with live or real time data values for the ever-changing characteristics of live data.

One particularly relevant aspect of data analytics is the prediction of a failure of an aspect of a process or a component in a device or system in the future. The prediction of a failure can be extreme in many situations, from preventing manufacturing downtime to preventing unnecessary harm to people and equipment due to unexpected or undesirable stress to a device or system. Unfortunately, the shortcomings of data analytics techniques, such as those described above, also often limit the ability to continually process and update the analytics associated with predicting a future failure, particularly when live or real time data can affect the failure point. Therefore, there is a need for an improved mechanism applying data analytics techniques to real time data as part of updating a predicted outcome, such as a failure point of a component or structure.

SUMMARY

These and other drawbacks and disadvantages presented by vertically oriented devices are addressed by the principles of the present disclosure, which are directed to an antenna assembly in a vertical electronic device. However, it can be understood by those skilled in the art that the present principles may offer advantages in horizontally oriented devices as well.

According to an implementation a method is described. The method includes generating a set of current values associated with at least one component included on a moving vehicle and providing the set of current values over a wireless network. The method further includes processing the set of current values in real-time using at least one machine learning algorithm to identify a value of a point in time for a failure of one of the at least one component based on the set of current values and at least one set of past values received. The method also includes transmitting of the set of current values with a low time latency between the generating the set of current values and the processing of the set of current values.

According to an implementation a system is described. The system includes a set of sensors, each one of the set of sensors generating a set of current values associated with at least one component included on a moving vehicle, the generated set of current values being transmitted over a wireless network. The system also includes an edge computing device that receives the set of current values transmitted over the wireless network, the edge computing device processing the set of values in real-time using at least one machine learning algorithm to identify a value of a point in time for a failure of one of the at least one component a based on the set of current values and at least one set of past values received. The generated set of current values are transmitted with a low time latency between the generating the set of current values and the processing of the set of current values.

According to an implementation, an apparatus is described. The apparatus includes a network interface that receives a set of current values over a wireless network, the set of current values generated from a set of sensors associated with at least one component included on a moving vehicle. The apparatus also includes at least one processing device coupled to the network interface, the at least one processing device processing the current set of data in real-time using at least one machine learning algorithm to identify a value for a value of a point in time for a failure of one of the at least one component a based on the current set of data and at least one previous set of data. The apparatus further includes a memory coupled to the at least one processing device, the memory configured to store the current set of data and the at least one previous set of data. The current set of data values being transmitted over the wireless network with a low time latency between the set of current values being generated and the set of current values being processed.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
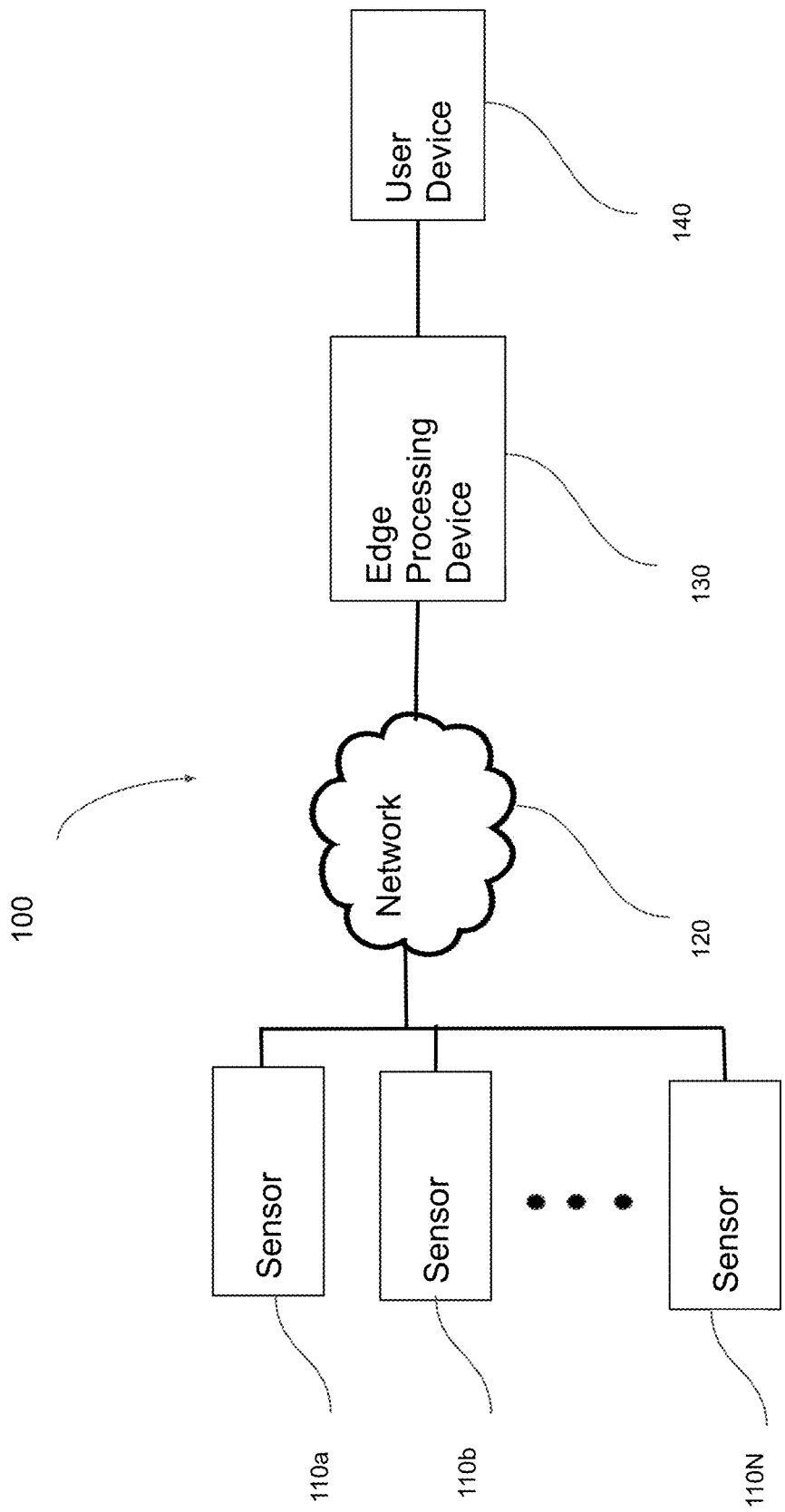
FIG. 1 is a block diagram of an exemplary system associated with data analysis and analytics to which the principles of the present disclosure are applicable.

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory, and input/output interfaces. Herein, the phrase "coupled" is defined to mean directly connected to or indirectly connected with one or more intermediate components. Such intermediate components may include both hardware and software based components.

The present description illustrates the principles of the present disclosure. It will thus be appreciated that those skilled in the art will be able to devise various arrangements which, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described, directly or indirectly, as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address problems associated with applying machine learning techniques and data analytics to operational systems and devices that have ever changing operational parameters. The present embodiments further address problems of handling these ever changing operational parameters in a real time or near real time manner. As a result, the need for real time or near real time analysis and updates as part of quickly identifying predictive outcomes or results before outcomes or results are stale, such as identifying failures of key components or elements before the failure occurs, is of paramount importance. Many machine learning algorithms employ models, such as the long-short-term model (LSTM), that operate in two phases, a training phase followed by a modeling phase to produce the results. The training phase often takes significant time to complete and can result in significant delays to the ability to produce predictive results quickly from current data. The embodiments described herein may be particularly useful in operational systems or devices with current values associated with parameters that may require constant re-evaluation against the past values, which would typically be employed as part of a training phase, and where the outcomes or results may be needed in real time or near real-time.

Rather than looking only to previous values to deliver predictions or future outcomes, the data analytics mechanism included in the present embodiments focus on using current values as well as past values to deliver and identify outcomes or results, such as failures, particularly those that may occur in the near future. Applying analytics or machine learning techniques to streaming data in real-time offers several advantages. For instance, the techniques applied in the present embodiments can amplify the functionality and precision of applications powered by artificial intelligence through ingestion of the most current set of data values associated with operational parameters or a system or device. The use of current data in the identification and/or prediction accelerates discovery of newly identified operational insights as well. Further, the approach of "fitting" a model to a dataset is replaced by machine learning techniques that include adaptability to "noise" in the system, such as periodic characteristics or non-linearities. In this approach, the machine learning technique can be adapted whenever new live or real time data is available and is able to continue to learn from additional and new live or real time data constantly.

The present disclosure focuses on embodiments that utilize aspects of the transportation or manufacturing industry and in some cases more specifically the automotive industry and automobile racing. The management of the operation of a race car, the changing of its operational characteristic, and identifying or predicting failures in components of a race car can occur during very brief time periods of operation. Such management, identification, or prediction requires a low time latency between generation of the values used and the production of outcome or results. The embodiments describe specific machine learning techniques, such as linear types of regression algorithms, which appear well suited to such conditions in automobile racing. However, one or more aspects of the present disclosure may apply to other industries and areas including, but not limited to, the home consumer electronics industry, the financial services industry, agriculture, chemical production, and the medical industry. Similarly, one or more aspects of the specific machine learning techniques described in the embodiments may apply to other machine learning algorithms that may be employed as part of those industries.

Referring now to FIG. 1, a block diagram of an exemplary embodiment of a system 100 associated with data analysis and analytics according to aspects of the present disclosure is shown. System 100 may be incorporated into any operational electromechanical system or device that can benefit from and utilize data analytics to improve operation. Such a system may be utilized in conjunction with moving vehicles, manufacturing equipment, safety equipment, or electronic devices, such as computers, televisions, gateways, and the like. System 100 includes a plurality of sensors 110a-110N. Sensors 110a-110N are electrically coupled to a network 120. The network 120 is further coupled to an edge processing device 130. The edge processing device 130 is coupled to a user device 140. It is worth noting that some elements necessary for operation of a complete system similar to what is shown in FIG. 1 are not shown as they are well known to those skilled in the art.

Sensors 110a-110N provide the electrical or electromechanical interface to the portion of a separate operational system or device (not shown) to which the data analytics will be applied. Examples of sensors that may be used for any or all of sensors 110a-110N include but are not limited to, pressure sensors, load sensors, temperature sensors, rotational sensors, vibrational sensors, chemical sensors, activity sensors, and the like. Each one or more of sensors 110a110N is affixed or otherwise incorporated into an electromechanical element of an operational system or device (e.g., moving vehicle, safety equipment, manufacturing equipment, etc.). Ideally the affixation or incorporation of the sensors 110a-110N with the electromechanical element has either a limited or no effect on operation or its effect is compensable by the element, system, or device. For example, a rotational sensor may be mounted adjacent to a rotating element in a system and be optically or electromagnetically coupled to a component included on the rotating element. In another example, a load sensor may be included as, or mounted to, a mechanical element of a race used to support the wheel and tire, such as a wheel hub or suspension arm. One or more of the sensors 110a-110N may include an electrical or electromechanical property or characteristic conversion mechanism. For example, a rotational sensor may include a conversion mechanism to translate mechanical rotation to an electrical voltage and include a mechanism to convert the electrical voltage to a digital signal. As another example, a load sensor may include a conversion mechanism to translate mechanical force or pressure to an electrical voltage and/or into a digital signal.

In some embodiments, one or more of the sensors 110a-110N may provide data values continuously while other sensors may provide data values in a periodic manner. In some cases, one or more of the sensors 110a-110N may provide data values only when requested to. Further, each one of the sensors 110a-110N may include a network interface for communicating data values from those sensors using network 120. The network interface for each one or more of sensors 110a-110N may be the same or may be different and may include a wired communication connection or a short range wireless communication connection. In some embodiments, a secondary network interface may be included to aggregate all communications from each one of sensors 110a-110N within the operational electromechanical system prior to providing the aggregate of data values over network 120.

Network 120 may include one or more communication mediums (e.g., wired, wireless) and may further encompass multiple types of networks using multiple communication mediums that may all be interconnected. One or more of these multiple types of networks may be connected through the internet. Some or all of network 120 may be private networks using proprietary network protocols. Additionally, or alternatively, some or all of network 120 may be public or standardized networks, such as cellular networks using a 3G, 4G, or 5G wireless protocol. In an embodiment, network 120 is a cellular network that operates in compliance with the 5G wireless protocol. Network 120 facilitates the transfer of the data values from the sensors to the edge processing device, which is more capable of processing the aggregate of data values to predict an outcome for a requested result or characteristic of the system or device (e.g., manufacturing equipment, motor vehicle) using data analytics techniques. It is important to note that in order to enhance the processing effectiveness of the data analytics techniques described in the present disclosure, networks that have lower latency as well as reasonably high data throughput are favored over networks that either have low latency and low throughput or high latency and high throughput for use as network 120.

Edge processing device 130 provides the signal and data processing capabilities and storage needed for maintaining current and past data values as well as producing a predicted outcome for a request result or characteristic of the system or device (e.g., manufacturing equipment, motor vehicle). Edge processing device 130 includes a network interface along with one or more processors, signal processors, math processors, and controllers for performing operations on the data values received from the sensors 110a-110N over network 120. Edge processing device 130 may also include one or more types of memory or storage. Edge processing device 130 may further include various other more local interfaces for connecting auxiliary equipment, such as keyboards, display monitors, and the like. Edge processing device 130 may be embodied as a server, a multi-edge computer server, a desktop computer, a mainframe computer, an edge card processor, and the like.

User device 140 receives any output data from edge processing device 130 and provides the output data through some form of user interface to an end user. One of the primary data outputs from edge processing device 130 may be the outcome for a requested result or characteristic based on an analysis of data (e.g., data from sensors 110a-110N) from the element, system, or device described earlier. For example, the outcome may be the prediction of failure of a punch plate in a piece of manufacturing equipment that is provided to the user as the number of remaining punches that can be performed before failure. Another example may be the prediction of failure of a tire on a race car that is provided to the user and the number of laps until tire failure. Other examples of output data from edge processing device 130 may include raw or re-formatted data values from one or more of sensors 110a-110N for display to the user. User device 140 may include various user interface elements, including, but not limited to, a display screen, audio device, keyboard, mouse, cursor controller, microphone, and the like. User device 140 may be embodied as a desktop computer, a laptop computer, a tablet computer, and mobile phone, and the like. It is worth noting that, in some embodiments, some or all of the structure and functions of user device 140 may be included as part of edge processing device 130. For example, edge processing device 130 may include a display for displaying information as well as a keyboard and/or cursor controller for entering user inputs to manipulate the display.

In operation, data values are generated and provided to the edge processing device 130 over the network 130. The data values include a set of current values associated with one or more components in the electromechanical system. The set of current values may be generated by one or more of the set of sensors 110a-110N included with the component(s). In some embodiments, the set of current values are generated by one or more load sensors for each of four tires, a left front tire, a right front tire, a left rear tire, and right rear tire, attached to a race car.

The data values, including the set of current values associated with the component(s), are provided to the edge processing device 130 and processed using one or more machine learning algorithms. The machine learning algorithms process the current set of values, along with one or more sets of past values associated with the component(s), to identify a point in time for a failure of one of the components. In general, the point in time for the failure will be a point in time in the future and may be referred to as a predictive failure. The machine learning algorithms may also perform additional processing as part of identifying the point in time for the failure, The additional processing may include, but is not limited to, data value extraction, data characteristic extraction, data pruning, and regression processing. The currently received data values, along with previously received data values, including previous sets of values associated with the component(s) may be stored in a memory in edge processing device 130. The memory may be organized as a database based on a specific program application in order to improve access to the previously received data values. In some embodiments, a database structure using the PostgreSQL program application may be used.

As part of the processing in the edge processing device 130, one or more intermediate or additional results from the machine learning algorithm may be produced or identified, along with the point in time for a failure of one of the components. The choice of result(s) to be produced by the machine learning algorithm may be directly programmed into or predetermined as part of the machine learning algorithm(s) in the edge processing device 130. Alternatively, the user may choose the results that are to be produced, for instance, if multiple results are possible. In some embodiments including a moving vehicle, the results may be chosen by the user and may include not only time at which a failure of one of the tires on the moving vehicle is to occur, but also a distance, such as a number of laps, at which the failure is to occur, based on processing sets of value values from the load sensors included with each of the tires.

The value for the point in time for the failure of the component(s) identified by the machine learning algorithm(s), along with the intermediate or additional results, may be provided to user device 140. The user device 140 displays the values and/or results to the user on a display component. The user device may also notify the user of potential issues based on the point in time for the failure either visually, aurally, or tactilely. In some embodiments, the display may include a graphic user interface or dashboard for an improved visual presentation of the value and/or results. The graphical user interface or dashboard may be generated using a program application, such as Grafana®.

The edge processing device 130 is considered to be a "first hop" network device that sits at the edge of the network 120. As a result, edge processing device 130 includes the capability to achieve and maintain low time latency associated with delivering data, such as the current set of values from sensors 110a-110N, over the network 120 for processing at the edge processing device 130. The low time latency is particularly important in systems where a large number of sensors 110a-110N may be generating data values and providing the data values over network 120. As an example, a typical race car may include almost 100 sensors capable of generating data values. Although in some cases data values from sensor 110a-110N may be generated continuously, the generating and delivery of data values, such as the current set of values, is typically limited to being periodic in nature. The periodic rate of data delivery may be dependent on the required accuracy and update requirements for determining any predictive values as part of the machine learning algorithm that is identifying the point in time for the failure of a component. In one embodiment, the values from each of four sensors are generated and provided at a rate of 10 to 20 values per second. Based on the rate for the sensors, the time latency from the generation of the values in sensors 110a-110N to the processing of the values in the edge processing device 130 may be 80 milliseconds. In other embodiments, higher or lower rates may be used depending on requirements and/or capabilities. In order to make the ingestion of data values over the network more efficient, a specific program application for data ingestion may be run on edge processing device 130.

It is worth noting that although some systems may include a large number of sensors 110a-110N, some of these sensors do not generate data values that require further processing using machine learning algorithms. For instance, a race car may include almost 100 sensors for various components, elements, and characteristics associated with its operation. Not all of the sensors may be used in conjunction with further processing in a machine learning algorithm to predict points in time for failures. Instead, the data values from these sensors may be used for monitoring operations of the system, such as monitoring the speed of the race car, the amount of fuel remaining in the fuel tank, or the view of the racetrack from the driver's seat. In some embodiments, a prioritization mechanism may be used as part of the specific program application for data ingestion in order to assign higher priority to data values from sensors that require further processing using machine learning algorithms, such as the load sensors associated with determining a point in time for a failure of one of the tires on the race car. Such a prioritization mechanism may further ensure low time latency for the higher priority data values.

Further, in some embodiments, a high performance database interface application may be used. Additionally, a time efficient machine learning algorithm may be used for processing the data values. The requirement for low time latency is made necessary in applications that require rapid updates, such as a race car that may cover a mile of distance every 20-30 seconds. Such low time latency associated with delivering data for processing may be referred to as real time or near real time delivery, processing, or updating. A specific implementation of a regression process used in a machine learning algorithm according to aspects of the present disclosure will be described in further detail below.

Figure 2:
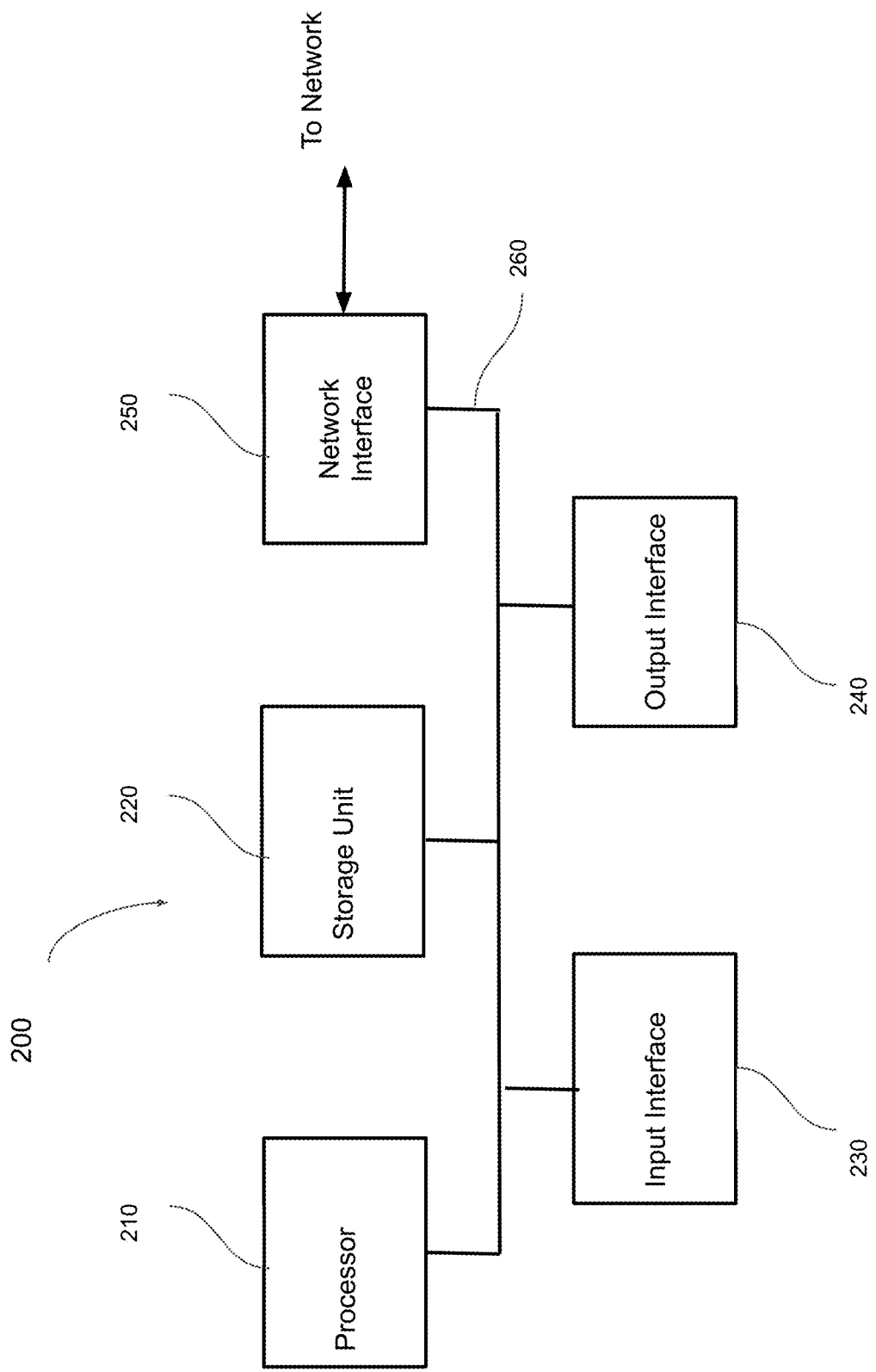
FIG. 2 is a block diagram illustrating an exemplary network device to which the principles of the present disclosure are applicable.

Turning to FIG. 2, a block diagram illustrating an exemplary network device 200 according to aspects of the present disclosure is shown. The network device 200 may operate in a manner similar to edge processing device 130 described in part of system 100 in FIG. 1. Network device 200 may also be used in conjunction with other systems including, but not limited to manufacturing devices, safety equipment, agricultural systems, chemical systems, medical systems, and the like. Network device 200 includes a processor 210, a storage unit 220, an input interface 230, an output interface 240, and a network interface 250 which are connected together electrically or otherwise coupled together by a communication bus 260. In some embodiments, one or more elements shown in the edge processing device 200 may be coupled together by a mechanism other than communication bus 260. It is worth noting that some elements necessary for operation of edge processing device 200 are not shown as they are well known to those skilled in the art.

The network interface unit 250 provides an interface between the network device 200 and the network (e.g., network 120 described in FIG. 1). The network interface unit 250 may be communicable with the network via a wired or wireless communication medium using one or more communication protocols. The communication protocols may include, but are not limited to, IEEE 802.3 (Ethernet), IEEE 802.11, cellular 3G, cellular 5G, satellite, and the like. The network interface unit 250 may include one or more interface elements, such as antennas or physical interface connections. The network interface unit 250 may also include additional circuits, such as receiver and transmitter circuits that receive and transmit signals that are compliant with the communication protocol(s). In embodiments involving moving vehicles, network interface unit 250 may utilize a wireless communication medium interface through one or more antennas and communication circuits designed to operate with the cellular 5G communication protocols.

The processor 210 is configured to control various operations of the edge processing device 200. The control operations may include the transfer of signals and/or data between the elements in the network device 200 as well as managing the specific operations of those elements. The processor 210 is also configured to perform any computations or processing necessary for operations associated with the functions needed to implement any of the data analytics algorithms. The processor 210 may be formed using any known and suitable hardware, software, or a combination of hardware and software. For example, the processor may be formed using dedicated hardware, such as an application specific integrated circuit (ASIC), or by a programmable processing unit, such as a Central Processing Unit (CPU), that is used to execute instructions or program code stored in storage unit 220.

The storage unit 220 stores at least one program to be executed by the processor, and various data, including current and/or past data values and used as part of computations performed by the processor 210. The storage unit 220 may also store intermediate data of computations performed by the processor 210, as well as results or data used by other elements internal or external to the network device 200. The storage unit 220 may include any suitable storage elements or means capable of storing any programs, data, and the like in a computer-readable manner. Examples of elements that may comprise the storage unit include non-transitory computer-readable storage media such as semiconductor memory devices, and magnetic, optical, or magneto-optical recording media loaded into a read and write unit. The semiconductor memory devices may include but are not limited to, RAM, ROM, Electrically-Erasable Programmable ROM (EEPROM), and flash memory.

The input interface 230 may include circuitry and physical interface components for one or more input elements that may be used by a user for entering data and/or control the operation of the edge processing device. The one or more input elements include, but are not limited to a keyboard, a mouse, a trackball, microphone, a touch panel, and the like. The output interface 240 may include circuitry and physical interface components for one or more output elements that may be used by a user to retrieve and consume information received and/or processed by the edge processing device. The one or more output elements include, but are not limited to, a display unit, a speaker, a vibratory unit, and the like. In some embodiments, the input interface 230 and output interface 240 may share a common physical interface allowing external devices having both input and output capabilities to interface to the edge processing device. The external devices include, but are not limited to, a cell phone, a tablet computer, a laptop computer, and the like. As shown in FIG. 1, a user device (e.g., user device 140) may interface with the network device 200 through one or both of the input interface 230 and the output interface 240 or may interface over the network through the network interface 250.

In operation, network interface unit 250 receives a set of data values over a wireless network (e.g., wireless network 120 in FIG. 1). The set of data represents at least a set of current values generated from a set of sensors (e.g., sensors 110a-110N) associated with at least one component included on a moving vehicle. The set of data values are provided to the processor 210. Processor 210 may perform any preliminary processing, such as data or feature extraction and data pruning as described above. Processor 210 also retrieves one or more sets of previously received data values (e.g., previous sets of values generated from the set of sensors) from storage unit 220. Processor 210 processes the received set of data values along with the previously received set(s) of data values by applying one or more machine learning algorithms to the sets of data. In some embodiments, processor 210 may apply a modified linear regression algorithm to the set of current values as well as a defined group of sets of previous values generated from the set of sensors. The modified linear regression algorithm may also be referred to as a dynamic linear regression algorithm. In one embodiment, the modified linear regression algorithm is based on an ordinary least squares regression with sets of sliding windowing functions to determine what sets of previous values generated from the set of sensors are included in the regression.

It is worth noting that in order to preserve receiving the set of data values and providing the data values for processing with lowest possible latency, a high speed data ingestion pipeline mechanism, such as a program application as described above, is used by processor 210 in conjunction with network interface 250. Further, although only one processor 210 is shown in the network device 200, it should be understood that such a processor may include different modules and units performing various operations or may be embodied as more than one processor circuit or element in order to implement the functions carried out by the network device 200 according to embodiments of the present disclosure.

As described above, the network device 200 utilizes a modified linear regression, or dynamic linear regression, algorithm to determine the predictive outcomes for results. Linear regression is the approach to modeling the relationship between a scalar response and one or more explanatory variables (also known as dependent and independent variables). Assume a Cartesian plane has 2 (X, Y) points (0,2) and (2,6), then Linear regression would fit to the best linear function. So, Y=MX+B becomes Y=2x+2. In this case, the points given above fit perfectly, however in the real world this will not always be the case. Existing linear regression algorithms assume that all the training data is available at once, which is often referred to as batch learning. Additionally, traditional linear regression algorithms are not able to continuously learn by themselves. The modified linear regression algorithm incorporates current data values, as real time, or live, data into the model.

Several linear regression models are available and well known, with each having its own specific characteristics. The determination of which model to use will often depend on the types of data used as well as the types of results that are requested. As an example, one of the more robust models is the Ordinary Least Squares (OLS) model. OLS can be explained as minimizing the sum of the squares of the differences between the predicted dependent variable and the actual dependent variable. An exemplary expression is given here:

$$\text{Find } \min_{\alpha,\beta} Q(\alpha, \beta), \text{ for } Q(\alpha, \beta) = \sum_{i=1}^{n} \hat{\varepsilon}_i^2 = \sum_{i=1}^{n} (y_i - \alpha - \beta x_i)^2.$$

Using the cartesian plane example above, Y=2x+2 is chosen because the sum of the squares of its differences are 0, and Y=X+3 is not chosen since the sum of the squares of its differences is 2:

For coordinates (0,2) (0+3)=3 error: 3−2=1

For coordinates (2,6) (2+3)=5 error: 5−6=−1

Sum of squares error: $(1)^2+(-1)^2=2$

However, the introduction of current, live, or real time values into many of the linear regression algorithms may create problems. For example, the introduction of data values that indicate a non-linearity in operation can create issues when identifying a time to failure with linear regression, particularly a future time to failure. These non-linearities may be a natural occurrence or may be a forced or intentional occurrence. For example, with respect to operation of a motor vehicle, the changing of a tire (e.g., from an old worn tire to a new tire) for which a sensor has been producing data values associated with tire load and/or vibration to determine a failure point will create a non-linearity in the data values. Further cyclical or periodic value changes caused by nominal vibrations patterns as part of the travel path for the motor vehicle, as in driving laps around a racetrack, may alter the accuracy of the identification. Additionally, a tire itself may produce data values that include a portion of the value that is due to nominal vibration or tire load, with each tire being different.

These and other non-linearities in behavior described above may be removed through offline review of the data values and adjustment of the data used for the regression algorithm. However, this offline review is not typically performed in a live or real time situation. In order to account for these non-linearities in real time, the linear regression algorithm is modified. First, the data values are windowed and processed in some manner, such as averaging the data value over a time period or distance traveled. Then, the windowed data values are further windowed, where the windowed linear regression algorithm is defined as linear regression using only the last N windowed data values. The windowed windowing or double windowing allows the linear regression algorithm to be more robust to the steep changes in data values, such as when a tire is changed, and also fit more closely to the expected pattern of change indicated while removing the repetitive or cyclical nature of the nominal data values. Additionally, the result, characterized as a point in time for a failure that is identified as a point in time in the future, is best characterized when it is a time that is much greater than the windowing time periods applied to the linear regression model. While the windowing helps remove steep changes, the longer predictive time span addresses minimizing the impact of nominal or background data values from the sensors and enhances the steady or continuous change in data values that are needed for the best or most accurate result or outcome.

As an example, consider the application of the modified linear regression algorithm to monitoring the data values from load sensors attached to a suspension or support element for each one of the four tires of a race car. The data values from the load sensors are used to determine or calculate an amount of tire vibration that is occurring for each tire. The vibration values are processed using a machine learning algorithm, such as the modified linear regression algorithm described above to identify a point in time for failure of each of the four tires. The tire load will have a cyclical nominal change in data values for load on each of the tires as the race car goes around the track for each lap. The data values for load will have a steep change when a tire is changed during a pit stop.

Looking at the example in more detail, a current set of data values for load, pressure, or force, from the load sensor(s) for each of the tires (LF, RF, LR, RR) are received and a vibration value is determined as the absolute value change in load, pressure, or force value from the previous load data value to the current load data value. A data window of one lap is used and the vibration values determined over one lap are averaged to produce a windowed vibration value, referred to as "AvgAbsVibration". The choice of one lap of distance represents an amount of time to capture a sufficient number of sets of values from the sensors and still address the cyclical or repetitive nature of the travel path of the race car. In some embodiments, a windowed vibration value is calculated once for each lap. In other embodiments, a windowed vibration value is calculated for each incoming current set of data values, resulting in higher accuracy. Further the second windowing function, referred to as regression windowing function, retrieves from memory as described earlier, the five most recent sets of past windowed vibration values, along with the set of calculated windowed vibration values for the current set of data values and provides these as an input to the modified linear regression algorithm (e.g., OLS model) to determine a slope and intercept. The slope and intercept are used to calculate a set of expected vibration values for a predetermined number of laps in the future. The expected vibration values are compared to a vibration threshold at which tire failure is known to occur. An identified lap for a tire failure or, alternatively a point in time for the tire failure, may be determined based on that comparison. The identified lap or point in time may be easily converted between each based knowing the avg speed of the race car over a lap. Other units of measurement may be used to express the identification of a failure based on a known relationship between the desired unit of measurement and the proper conversion factors.

The present example uses one lap of data values to produce a windowed vibration value (AvgAbsVibration) and the modified linear regression model uses a total of six windowed vibration values, one current value and five previous values, to predict tire failure. However, in other embodiments involving different operational parameters or situations, such as a motor vehicle operating under a normal road driving situation or a rotating device operating in a manufacturing situation, other data sizes may be used for generating the windowed vibration values and/or more or fewer windowed vibration values may be used as part of the modified linear regression model without deviating from the scope of the present disclosure.

It is important to note that the number of data values provided over one lap may be large. As described above, a delivery rate of 100 data values per second is not unattainable or unexpected. Depending on the distance that may constitute a lap at a racetrack and the windowing parameters chosen, the determination of windowed vibration values may involve more than 10,000 data values. It is also important that, in some embodiments, one or both of the vibration value windowing function and the regression windowing function may be a sliding or rolling window function. In other words, a new set of windowed vibration values that contain new data value(s) as well as the sets of data values previously used in the set of windowed vibration values without the oldest set of data value(s), is used to compute a new windowed vibration value as each new data value(s) from the load sensors on each of the tires is provided to the processor. In other embodiments, a sliding window function for one or both of the data windowing function and the regression windowing function may include more than one new set of data values from the load sensors that are received as described earlier, depending on a desired or required granularity level for the outcomes or results.

Figure 3:
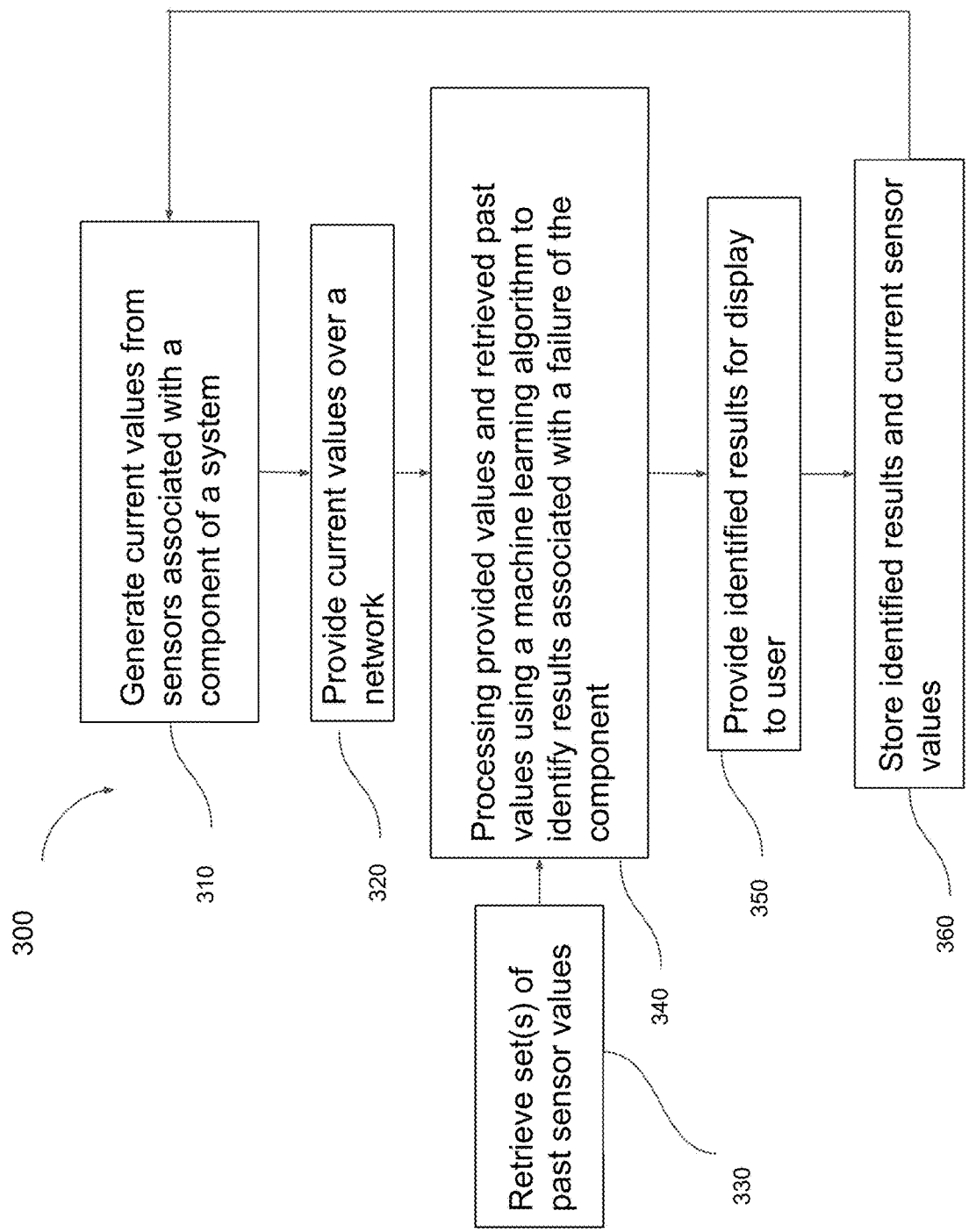
FIG. 3 is a flow chart of an exemplary process for providing data analytics to identify point in time for a failure in a system to which the principles of the present disclosure are applicable.

Turning to FIG. 3, a flow chart of an exemplary process 300 for providing data analytics to identify point in time for a failure in a system according to aspects of the present disclosure is shown. Process 300 is primarily described as part of use and operation in a system similar to system 100 described in FIG. 1. Further, one or more of the steps in the process can be performed in an edge processing device similar to that described in FIG. 2. While process 300 may be described in association with certain types of systems, such as, electromechanical systems, such as moving vehicles, process 300 may easily be adapted for use in other systems, such as manufacturing devices, safety equipment, electronic devices, agricultural systems, chemical systems, medical systems, and the like. Although process 300 depicts steps performed in a particular order for purposes of illustration and discussion, the operations discussed herein may not be limited to any particular order or arrangement. One skilled in the art, using the description of the present embodiments herein, will recognize that one or more of the steps of process 300 may be omitted, rearranged, combined, and/or adapted in various ways.

At step 310, a set of current values is generated from a set of sensors (e.g., sensors 110a-110N) associated with a component of a system. The system may be an electromechanical system, such as a moving vehicle, a manufacturing component, or an electronic device, as described above. In some embodiments, the system may be a race vehicle. In some embodiments, one or more of the sensors may be a load sensor. Further, one or more of the set of sensors may include, but is not limited to, pressure sensors, temperature sensors, and speed sensors, as described above. The set of sensors may be capable of generating a current set of values continuously or on a periodic basis. In some embodiments, the sensors may be capable of generating a current set of values every 80 milliseconds.

At step 320, the current set of values generated at step 310 are provided over a network (e.g., network 120) to a device (e.g., edge processing device 300). The network may be a wired or wireless network such as one of the networks described above. In some embodiments, the network is a 5G cellular network. The device receives the current set of values from the network through a network interface. In some embodiments, a high speed data ingestion pipeline mechanism, such as a program application, may be included along with the network interface in the device, as described above.

At step 330, one or more sets of past values generated from the set of sensors, as in step 310, are retrieved from a memory in a device (e.g., edge processing device 130). The past values were generated during previous iterations of process 300 and stored in the memory. In some embodiments, the sets of past values may be stored in a specifically arranged database structure using the PostgreSQL program application as described above. The number of sets of past values that are retrieved, at step 330, may be determined based on requirements for further processing of the current set of values.

At step 340, the current set of values provided, at step 320, along with the one or more sets of past values retrieved, at step 330 are processed using one or more machine learning algorithms. The processing may be performed in a processing element in the device (e.g., edge processing device 130). The machine learning algorithms process the sets of values in order to identify or predict outcomes or results associated with a failure of the component in the system. In most cases the outcome or result will include identifying a point in time for the failure of the component, as described above. The machine learning algorithms may be the same or may be different algorithms. The machine learning algorithms may be embodied as separate components in the processing element or may be embodied as separate threads in software. In some embodiments, one or more of the machine learning algorithms is a dynamic linear regression algorithm similar to that described above. For instance, the dynamic linear regression algorithm may utilize an (OLS) model or a similar model. The dynamic linear regression model may utilize one or more windowing operations as described above. Additionally, based on the instructions associated with the specific machine learning algorithm, a defined number of sets of past data values, or even a specifically identified set of past data values, may be retrieved from memory in the device.

At step 350, the results, or outcomes, such as the point in time for a failure of the component, identified, at step 340, is provided to a user for display. The results or outcomes may be provided through an output interface on the device (e.g., edge processing device) for display on a user device (e.g., user device 140). In some embodiments, the device may include a display element and the results or outcomes may be displayed directly on the device. It is worth noting that in some embodiments, some or all of the current set of values may also be provided, at step 350 to the user. In some embodiments, the results, or outcomes, along with the current set of values, may be displayed as part of a graphic user interface. An example of a graphic user interface that may be used with process 300 in conjunction with a device or user device will be described in further detail below.

At step 360, the results, or outcomes, such as the point in time for a failure of the component, identified, at step 340, along with the set of current values, are stored in a memory in the device (e.g., edge processing device 130). In some embodiments, the set of current values may be stored with the sets of past values in a specifically arranged database structure as described in above. The results or outcomes may also be stored in the same database structure but may be stored separate from the values. Process 300 returns to step 310 to generate a next set of current values. Process 300 continues to iterate, updating the results or outcomes (e.g., an updated point in time for failure) identified by the machine learning algorithms based on the next set of current values, until process 300 is stopped or interrupted by some external input, such as the user stopping the process or the system (e.g., system 100) being disengaged or turned off.

It is worth noting that the results or outcomes, such as the point in time for a failure of the component, identified using the set of current values received, at step 310, and processed, at step 340, represent updates the results or outcomes identified using the set of values received immediately before receiving the set of current values. It is further worth noting that the new predictive value(s) may be the same as or different than the previous predictive value(s) depending on factors associated with the data analytics algorithm as well as the data values received, the previous data values received, and the sets of values retrieved from the storage for each occurrence. In this manner, the machine learning algorithm used, at step 340, should be capable of identifying results or outcomes at least as quickly as the periodic rate of receiving the current set of values, at step 310.

Figure 4:
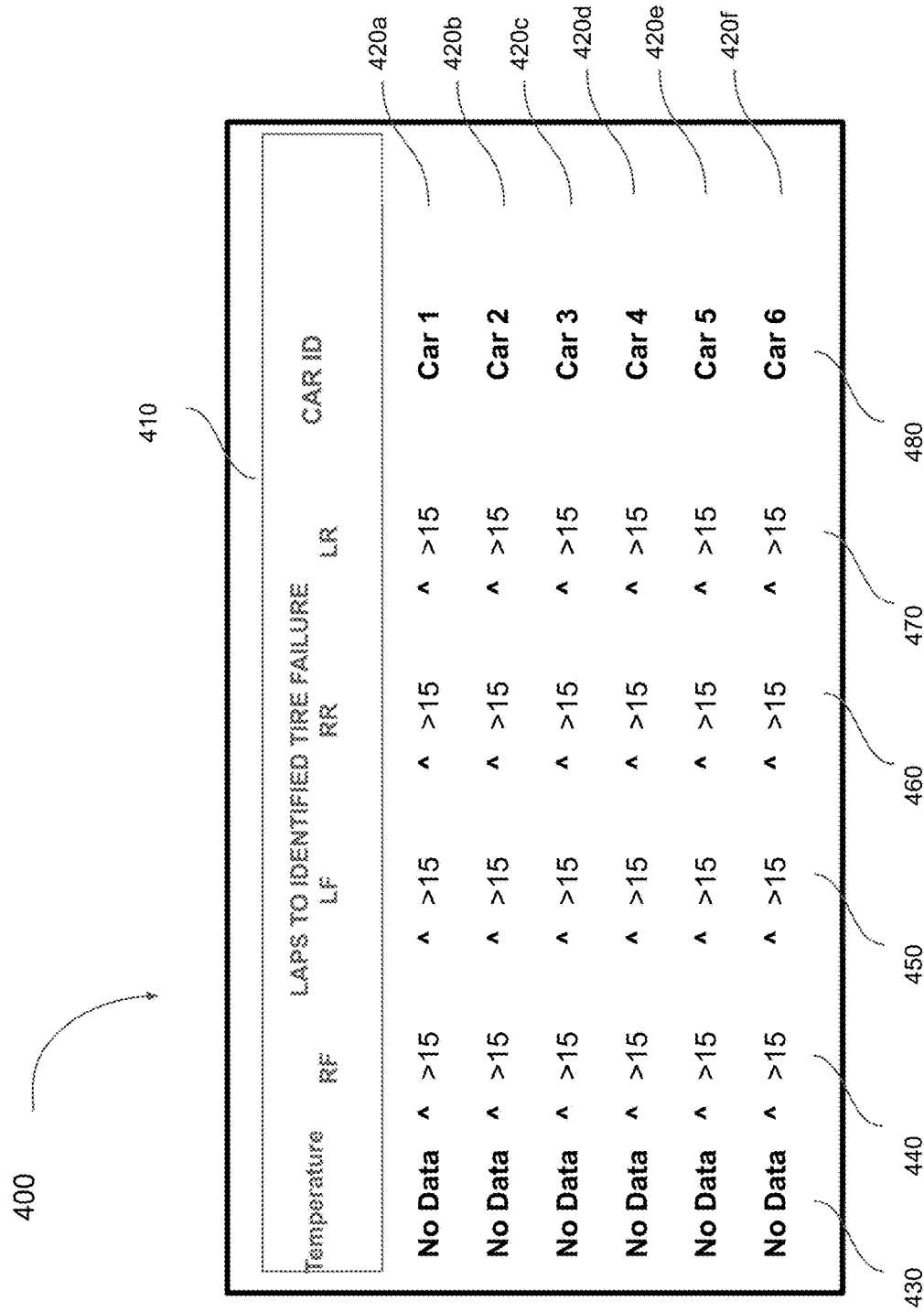
FIG. 4 is a screenshot of an exemplary display in a graphic user interface associated with providing data analytics in a system to which the principles of the present disclosure are applicable.

Turning to FIG. 4, a screenshot of an exemplary display 400 in a graphic user interface associated with providing data analytics in a system according to aspects of the present disclosure is shown. The display 400 may be incorporated as part of the operation of a user device, such as user device 140 described in FIG. 1. The display 400 may equally be incorporated as part of the operation of a network device, such as network device 200, that is used in conjunction with an electromechanical system that includes the ability to generate and display results of data analytics using a process, such as process 300 described in FIG. 3. Display 400 may be used as part of providing the identified value or values of the point in time for a failure of a component in a system, such as tires on one or more race cars, to a user on a display. In addition, other information about the system, including but not limited to unprocessed or processed data value from other sensors in the system, may be displayed as part of display 400.

Display 400 includes a header section 410 that identifies the parameters and values that will be displayed. Header section 410 identifies a column 480 for displaying a car identification (CAR ID) on the right, along with a column 430, for displaying (engine) temperature on the left side. Header 410 further identifies four columns, 440-470 for displaying the number of laps remaining to an identified tire failure for each of the four tires on the car, labeled as RF, LF, RR, and LR, respectively. The values for each car being analyzed are displayed along with the CAR ID value from column 480 in rows 420*a*-420*f*, respectively. In other embodiments, more or fewer cars may be analyzed or displayed in display 400, resulting in more or few rows.

As shown, values for engine temperature in column 430 for each of the cars in rows 420*a*-420*f*, are displayed as "No Data". A displayed value of "No Data" indicates, for instance, that the sensors that are used to generate values for engine temperature in the race cars are either not generating values or not providing values over the network. For example, the sensors may be removed as a decision to save cost. Further, columns 440-470 display values for laps remaining to the identified tire failure that is computed from the values generated from the machine learning algorithm(s) for the point in time for a failure for each tire, as described above. The value for the number of laps remaining may be computed by determining the time difference from the current time to the point in time for the failure. The time difference is further multiplied by the average speed of the race car, with that result divided by the distance covered by each lap. As shown, all tires on all race cars have greater than a threshold value of 15 laps remaining before which the vibration determined from the data values provided by the sensors (e.g., sensors 110a-110N) would become intolerable and a tire failure has been identified to occur. The threshold value used may be entered by the user or may be predetermined based on, for instance, continued safe operation before tire failure or degradation of performance based on the data values from the sensors. Further, in some embodiments, If the laps remaining until tire failure is less than the threshold value, the value displayed for the entry in the column 440-470 and row 420a-420f may change to indicate a warning to the user, such as displaying the laps remaining in a different color.

It is worth noting that the vibration characteristics that occur in a race vehicle or race car may be referred to as "racing vibrations" because that is what can be felt by the driver based on the operation of the race vehicle. Aspects of the present embodiments, such as the application of machine learning algorithms to determine a point in time for a failure of a tire, as described above may be similarly applied to other moving vehicles. For example, aspects of the present embodiments may be used to determine the balance between tires in a commercial vehicle, such as a semi-trailer truck vehicle, and determine a point in time that a balance service or tire change may be required.

The elements and display characteristics shown in display 400 may be modified or adjusted by a user. For example, a user may adjust the display values in columns 440-470 to include the actual lap at which a tire failure is identified or the actual number of laps remaining with no threshold, as opposed to showing the number of laps remaining as greater than a threshold value. Further, additional information, such as additional sensor data about the race cars, may be displayed in place of or in addition to, engine temperature in column 430 in the same or additional columns as needed.

Figure 5:
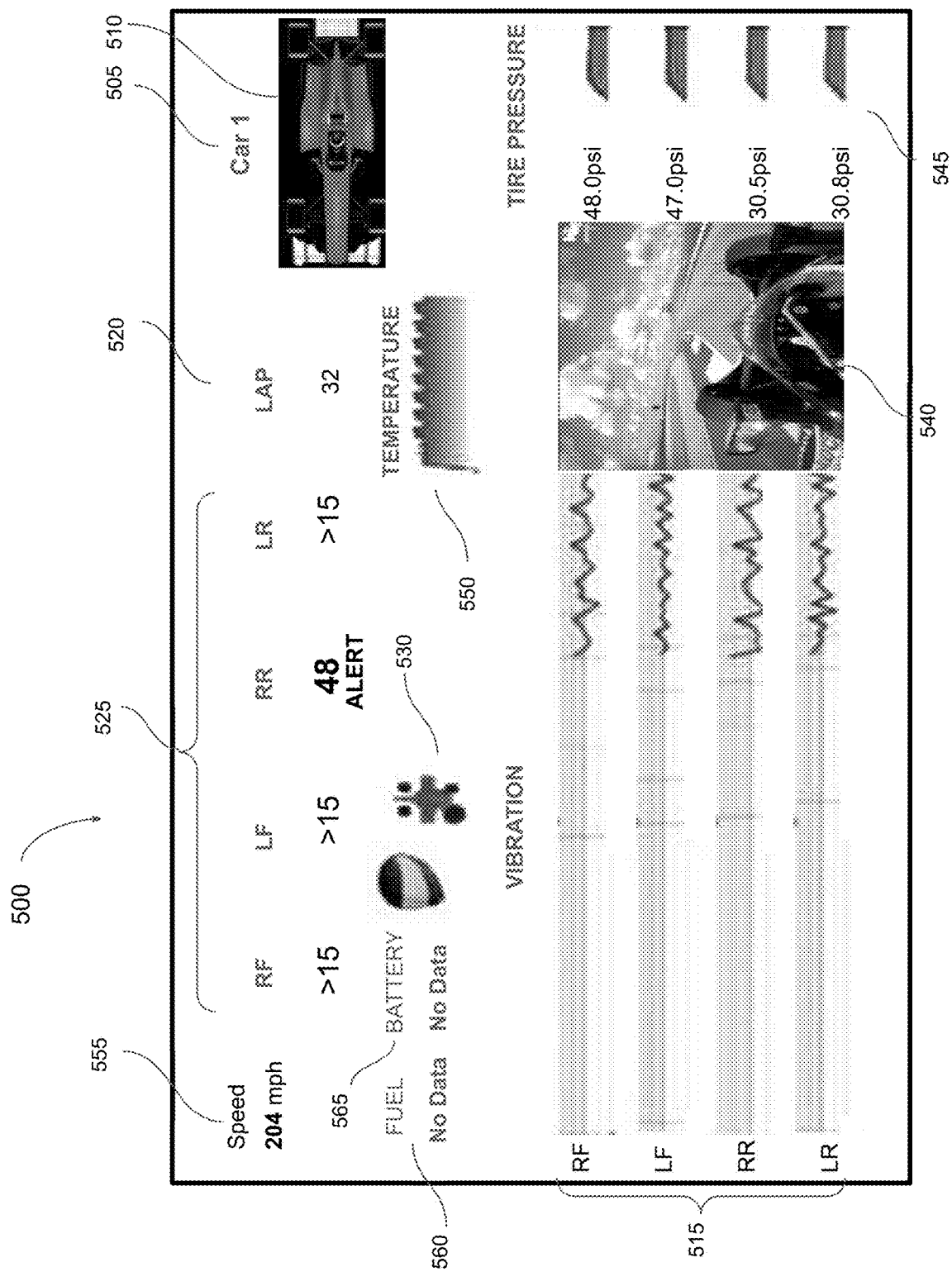
FIG. 5 is a screenshot of another exemplary display in a graphic user interface associated with providing data analytics in a system to which the principles of the present disclosure are applicable.

Turning to FIG. 5, a screenshot of another exemplary display 500 in a graphic user interface associated with providing data analytics in a system according to aspects of the present disclosure is shown. The display 500 may be incorporated as part of the operation of a user device, such as user device 140 described in FIG. 1. The display 500 may equally be incorporated as part of the operation of a network device, such as network device 200, that is used in conjunction with an electromechanical system that includes the ability to generate and display results of data analytics using a process, such as process 300 described in FIG. 3. Display 500 may be used as part of providing the identified value or values of the point in time for a failure of a component in a system, such as tires on one race car, to a user on a display. In addition, other information about the system, including but not limited to unprocessed or processed data value from other sensors in the system, may be displayed as part of display 500.

Display 500 includes CAR ID element 505 that identifies the race car, as Car 1, for which information is being displayed. Display 500 also includes visual element 510 that shows a visual representation of the identified car. Display 500 also includes a set of graphs 515 which show the sets of values for the sensors that are associated with each of the tires on the race car (RF, LF, RR, LR). The sets of values include the current set of values along with one or more previous sets of values for the sensors. Element 520 displays the current lap on the racetrack that the race car (e.g., Car 1) is running as part of its current race or event. Element 525 either displays values for laps remaining to the identified tire failure as a threshold level as described for columns 440-470 above or, if the laps remaining is less than or equal to the threshold value, displays the actual lap for which a tire failure has been identified. In addition, the display of the latter is modified to include an alert and a color change for the displayed value. In addition, element 530 displays a visual representation of the race car and displays the location of the tire, in this case RR, which has reached or exceeded the threshold value from element 525.

As described above in FIG. 4, display 500 may also display other information associated with the race car. As shown, Element 540 displays live video from a camera mounted at the driver seat in the cockpit of the race cat Element 545 displays a set of graphs representing the tire pressure for each of the tires on the race car over time. Element 550 displays a graph for the temperature of the engine on the race car over time. Element 555 displays the current speed of the race car as it is running laps on the racetrack. Elements 560 and 565 display the fuel level and the battery operating level or voltage, respectively. It is worth noting that the values displayed for elements 560 and 565 indicate "No Data" as described above.

While the present embodiments have been described primarily with respect to processing data from load sensors associated with tires on a race car or race vehicle, in some embodiments, data from other sensors associated with components on a motion vehicle, as described above, may be similarly processed to determine a point in time for a failure of that component. For example, values for temperature associated with a component in the engine or the entire engine may be processed to determine a point in time for a failure of a component in the engine, leading to engine degradation or failure. Further, it is to be appreciated that, except where explicitly indicated in the description above, the various features shown and described are interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of an apparatus and method for processing sensor data to predict future outcomes, it is noted that modifications and variations can be made by persons skilled in the art in light of the above teachings. It is therefore to be understood that changes may be made in the particular embodiments of the disclosure which are within the scope of the disclosure.

The invention claimed is:

1. A method comprising:
generating a set of current values associated with at least one component included on a moving vehicle;
providing the set of current values over a wireless network;
processing the set of current values in real-time using at least one machine learning algorithm to identify a value of a point in time for a failure of one of the at least one component based on the set of current values and at least one set of past values received, the at least one machine learning algorithm being a dynamic linear regression algorithm utilizing at least one windowing operation, the at least one windowing operation performing a first windowing operation that includes an averaging of the set of current values and the at least one set of past values to produce a current set of first windowed values for the one of the at least one component, and wherein the at least one windowing operation further includes performing a second windowing operation on the current set of first windowed values, along with past sets of first windowed values, to produce a current set of second windowed values that are used to produce results at different points in time by the dynamic linear regression algorithm; and providing, for display to a user, the value of the identified point in time for the failure the at least one component, the value of the identified point in time for the failure displayed in a different color when it is determined that the identified point in time for the failure is less than a threshold value for the point in time for the failure, wherein the providing of the set of current values has a low time latency between the generating the set of current values and the processing of the set of current values.

2. The method of claim 1, wherein the identified value of the point in time for the failure is included as part of a graphical user interface for displaying operational elements of the moving vehicle.

3. The method of claim 1, wherein each one of the results at different points in time is compared to a threshold value to determine the point in time for a failure.

4. The method of claim 1, wherein the at least one component includes a tire and wherein the set of current values are generated by at least one load sensor coupled to the tire.

5. The method of claim 1, wherein the set of sensors generate a set of current values on a periodic basis.

6. The method of claim 1, wherein the wireless network is a 5G cellular network.

7. The method of claim 1, wherein the moving vehicle is a race vehicle.

8. The method of claim 1, wherein the low time latency is less than 100 milliseconds.

9. A system comprising:
a set of sensors, each one of the set of sensors generating a set of current values associated with at least one component included on a moving vehicle, the generated set of current values being transmitted over a wireless network; and an edge computing device that receives the set of current values transmitted over the wireless network, the edge computing device processing the set of current values in real-time using at least one machine learning algorithm to identify a value of a point in time for a failure of one of the at least one component a based on the set of current values and at least one set of past values received, the at least one machine learning algorithm being a dynamic linear regression algorithm utilizing at least one windowing operation, the at least one windowing operation performing a first windowing operation that includes an averaging of the set of current values and the at least one set of past values to produce a current set of first windowed values for the one of the at least one component, and wherein the at least one windowing operation further includes performing a second windowing operation on the current set of first windowed values, along with past sets of first windowed values, to produce a current set of second windowed values that are used to produce results at different points in time by the dynamic linear regression algorithm, the edge computing device further providing, for display to a user, the value of the identified point in time for the failure the at least one component, the value of the identified point in time for the failure displayed in a different color when it is determined that the identified point in time for the failure is less than a threshold value for the point in time for the failure;

wherein the generated set of current values are transmitted with a low time latency between the generating of the set of current values and the processing of the set of current values.

10. An apparatus comprising:
a network interface that receives a set of current values over a wireless network, the set of current values generated from a set of sensors associated with at least one component included on a moving vehicle;

at least one processing device coupled to the network interface, the at least one processing device processing the set of current values in real-time using at least one machine learning algorithm to identify a value for a value of a point in time for a failure of one of the at least one component a based on the set of current values and at least one set of past values, the at least one machine learning algorithm being a dynamic linear regression algorithm utilizing at least one windowing operation, the at least one windowing operation performing a first windowing operation that includes an averaging of the set of current values and the at least one set of past values to produce a current set of first windowed values for the one of the at least one component, and wherein the at least one windowing operation further includes performing a second windowing operation on the current set of first windowed values, along with past sets of first windowed values, to produce a current set of second windowed values that are used to produce results at different points in time by the dynamic linear regression algorithm;

a memory coupled to the at least one processing device, the memory configured to store the set of current values and the at least one set of past values; and an output interface coupled to the at least one processing device, the output device providing, for display to a user, the value of the identified point in time for the failure the at least one component, the value of the identified point in time for the failure displayed in a different color when it is determined that the identified point in time for the failure is less than a threshold value for the point in time for the failure, wherein the current set of data values are received over the wireless network with a low time latency between the set of current values being generated and the set of current values being processed.

11. The apparatus of claim 10, wherein the at least one component includes a tire and wherein the set of current values are generated by at least one load sensor coupled to the tire.

* * * * *